Oct. 6, 1964   W. A. WATHEN ETAL   3,151,430
MOWER
Original Filed March 17, 1958   3 Sheets-Sheet 1

INVENTORS.
WILLIAM A. WATHEN &
BY MERLE H. PETERSON

ATTORNEYS.

Oct. 6, 1964   W. A. WATHEN ETAL   3,151,430
MOWER

Original Filed March 17, 1958   3 Sheets-Sheet 2

INVENTORS.
WILLIAM A. WATHEN &
MERLE H. PETERSON
BY

ATTORNEYS.

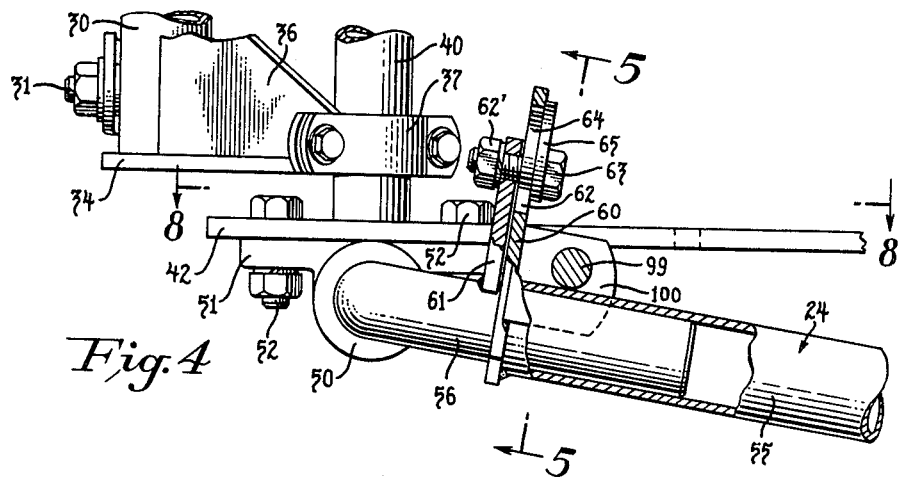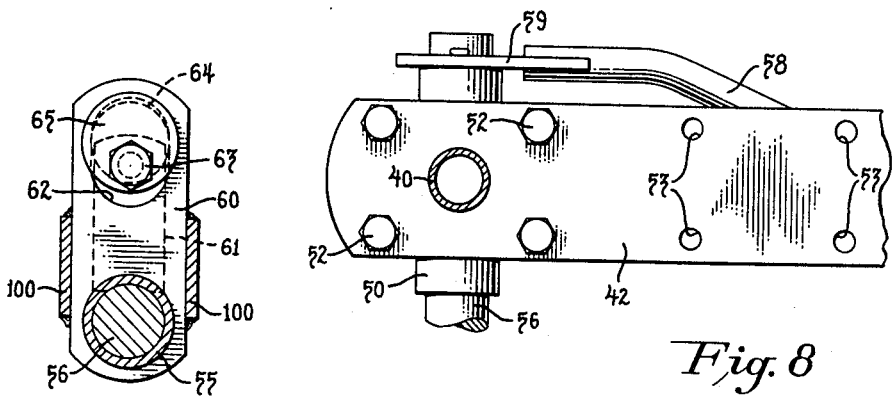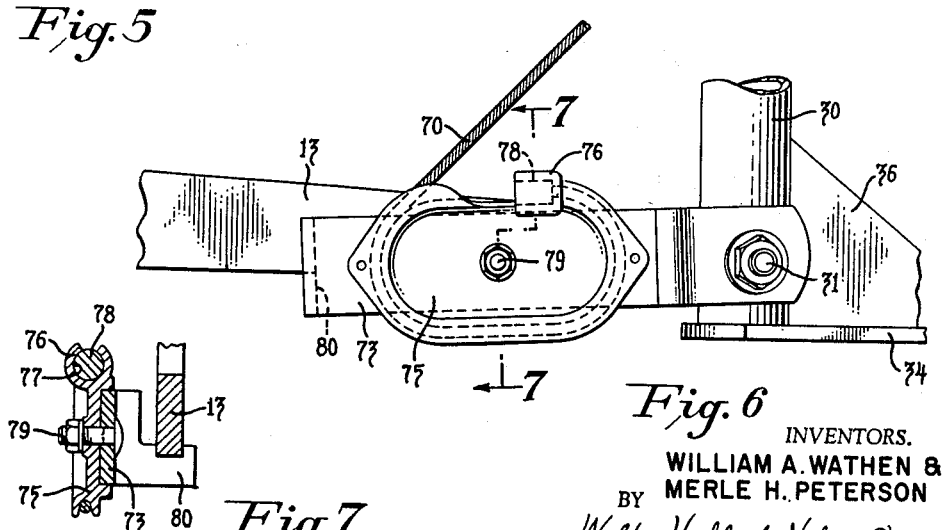

United States Patent Office 3,151,430
Patented Oct. 6, 1964

3,151,430
MOWER
William A. Wathen and Merle H. Peterson, Detroit, Mich., assignors to Massey-Ferguson Inc., Detroit, Mich., a corporation of Maryland
Original application Mar. 17, 1958, Ser. No. 721,948, now Patent No. 2,984,960, dated May 23, 1961. Divided and this application Aug. 31, 1960, Ser. No. 53,090
5 Claims. (Cl. 56—25)

The invention relates to tractor mounted mowers generally and more particularly to mowers adapted to be directly coupled to a tractor in trailing relation. This application is a division of our co-pending application, Serial No. 721,948, filed March 17, 1958, and now Patent No. 2,984,960, issued May 23, 1961.

One object of the invention is to provide an improved cutter bar drive for mowers of the above general character.

Another object is to provide for supporting and driving the cutter bar in a manner such that the drive mechanism automatically accommodates itself to adjustment of the angular position of the cutter bar.

A further object is to provide simple yet efficient means by which the up-and-down tilt of the cutter bar may be adjusted for most efficient operation.

Other objects and advantages of the invention will become apparent from the following detailed description of the preferred embodiment illustrated in the accompanying drawings in which FIGURE 1 is a plan view of a mower embodying the features of the invention, the mower being shown as coupled to the rear end of a tractor.

FIG. 4 is a fragmentary rear view of the mower on a slightly enlarged scale showing details of the drag bar and its mounting on the mower frame structure.

FIG. 5 is a sectional view taken in a plane substantially on the line 5—5 of FIG. 4.

FIG. 6 is a fragmentary side view of the mower taken in a plane substantially on the line 6—6 of FIG. 1.

FIG. 7 is a fragmentary sectional view taken in a plane substantially on the line 7—7 of FIG. 6.

FIG. 8 is a fragmentary sectional view taken in a plane substantially on the line 8—8 of FIG. 4.

For purposes of illustration a single preferred embodiment of the invention and its association with a particular type of tractor have been shown and will be described herein in some detail. It is to be understood, however, that there is no intention that the detailed character of the disclosure should limit the invention to such particulars. On the contrary, the intention is to cover all modifications, adaptations and alternative constructions of the mower and its association with other types of tractors consistent with the spirit and scope of the invention as more broadly and generally characterized in the appended claims.

Figure 1:
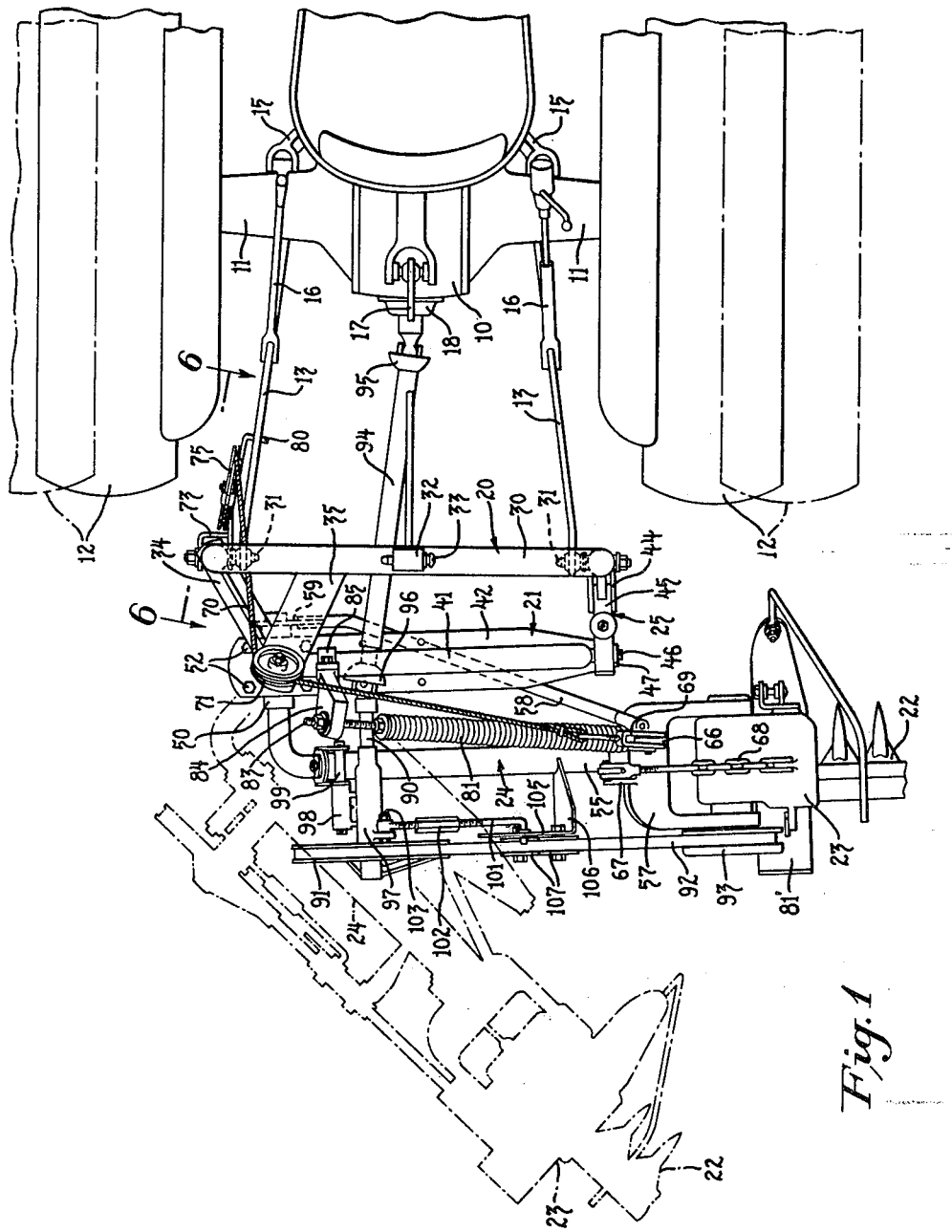

While the improved mower may be mounted on and operated with various types of tractors, it has been shown here as mounted on the hitch linkage of a "Ferguson" tractor. As shown in FIG. 1, this tractor has a center housing 10 with axle housings 11 extending from opposite sides and supporting rear drive wheels 12. The lateral spacing of the wheels 12, that is, the tread width of the exemplary tractor, is adjustable in steps conforming to the commonly used row spacing of various row crops. The wheels 12 are shown in full lines adjusted for minimum spacing and in broken lines as adjusted for a wider spacing. It will be appreciated that the tire spacing or tread width, whether fixed as in the case of some tractors, or adjustable as herein shown, may vary substantially in tractors of different sizes and different makes.

Tractors of the type shown are equipped with a power elevatable implement hitch linkage including a pair of trailing, laterally spaced draft links 13 pivotally connected to the center housing by universal pivots located below and slightly forward of the axes of the housings 11. The draft links are swingable vertically by power operated lift mechanism provided on the tractor and acting through a lift shaft 14 (FIG. 3) journaled on the upper part of the center housing. The shaft 14 has lift arms 15 at opposite ends connected with the respective draft links by drop links 16.

The implement hitch linkage also includes a top or control link 17 pivotally secured at its forward end to a control element carried on the center housing. It extends rearwardly to present, with the draft links, three triangularly spaced points for connection with an implement. A power take-off shaft projects through a pad or extension 18 at the rear of a center housing 10 for supplying power to implements attached to the linkage.

Figure 2:
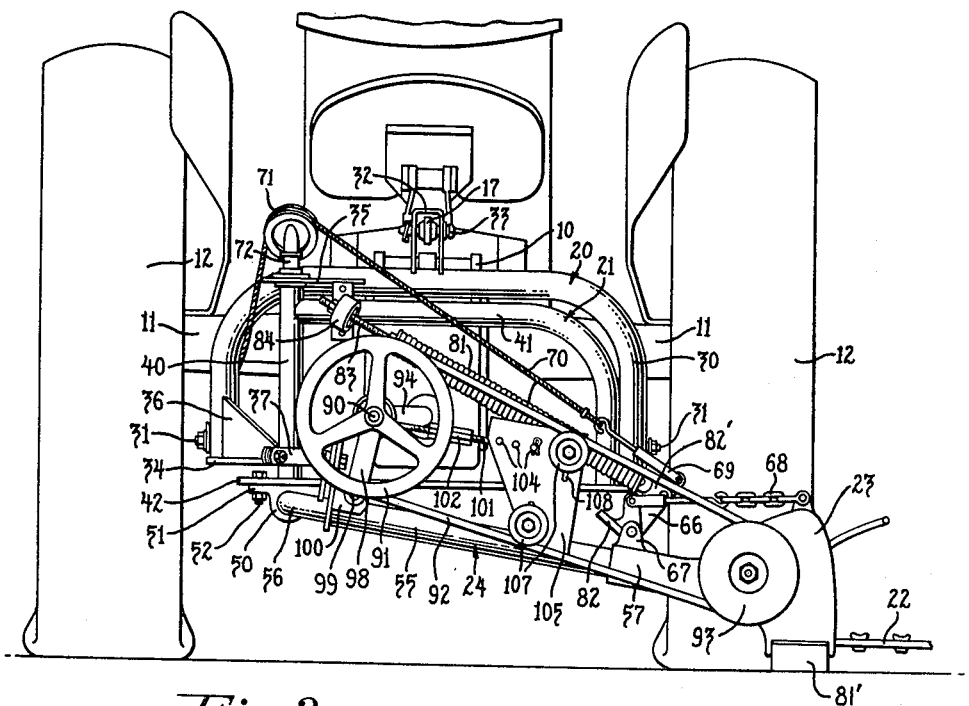
FIG. 2 is a rear elevational view of the mower and tractor.

In the preferred form shown in FIGS. 1-3 of the drawings, the improved mower has a frame structure of simple, rugged construction which affords a number of advantages to be discussed hereinafter. The frame structure comprises a first or main frame 20 equipped with all necessary elements for reestablishing the three-point connection with the tractor hitch linkage. It also includes a second or swinging frame 21 which is pivotally mounted on the first frame to swing about a generally upright axis located at one side of the frame. The frame 21 supports the mower cutter bar 22 and its drivehead 23, the latter being pivotally mounted at one end of a drag bar 24 which, in turn, is pivotally mounted on the frame 21.

The pivot for the drag bar is disposed generally horizontally and extends fore-and-aft to permit the cutter bar and drivehead to swing between a lowered operating position and a raised transport position. The pivotal support for the drivehead 23 permits it, along with the cutter bar, to be tilted upwardly clear of obstructions and to be raised to a generally upright out-of-the-way position for transport. Provision is made for swinging the cutter bar and drag bar about their pivots in predetermined sequence incident to the raising or lowering of the tractor hitch linkage. Means is also provided for driving the cutter bar from the power take-off shaft of the tractor.

The swinging frame 21 is normally held in a predetermined fixed position relative to the main frame 20, in this instance, substantially parallel to the latter frame by releasable latch mechanism 25 interposed between the two frames. In the normal latched position of the frame 21, the cutter bar is presented so as to extend laterally of the tractor and cut a swath parallel to the path along which the tracor is driven. The latch mechanism 25, which is wholly contained in the frame structure, is settable to release the swinging frame for rearward swinging or breakback to the position shown in broken lines in FIG. 1 when the cutter bar meets an obstruction. Damage to the cutter bar or to the parts of the mower is thus prevented.

Referring more in detail to the frame structure of the exemplary mower, the frame 20 preferably comprises an inverted U-shaped member 30 herein shown as tubular. Adjacent the lower ends of the legs of the member, connecting elements in the form of pins 31 are provided for engagement with the coupling elements conventionally provided at the trailing ends of the tractor draft links 13. A U-shaped bracket 32 welded or otherwise secured to the central portion of the member 30 and extending upwardly therefrom is apertured to receive a pin 33 for connecting the top link 17 to the frame structure.

Rigid with and forming a part of the main frame 20 are a pair of vertically spaced bearing brackets 34 and 35 for pivotally supporting the swinging frame 21. Bracket 34, herein shown as an elongated bar or plate reinforced by a triangular gusset 36 is welded or otherwise rigidly secured to the lower end of the legs of member 30. A split sleeve bearing 37 adjacent the outer end of the plate 34 cooperates with a portion of the swinging frame to be described later.

Upper bracket 36 may conveniently comprise a metal plate welded at one end to the upper portion of the frame member 30 and extending rearwardly to overlie the bearing carried by the bracket 34. As shown in FIG. 1, the two brackets are attached to the frame member 30 in laterally spaced relation and are inclined toward each other to afford maximum strength and rigidity.

The swinging frame 21 as shown comprises an upright tubular post 40 forming one side of the frame. An L-shaped tubular member 41 welded at one end to the post adjacent its upper end forms the top and other side of the frame. A relatively heavy flat plate 42 extends between and is welded or otherwise rigidly secured to the lower end of the post 40 and the depending leg of the member 41 to form the bottom member frame. The post 40 is embraced adjacent its lower end by the bearing 37 and is journaled at its upper end in the bearing bracket 35 for pivotal movement about a generally vertical axis as before explained.

The latch mechanism 25 which normally holds the frame 21 in working position is constructed and arranged to release upon predetermined pressure tending to swing the cutter bar rearwardly. As shown in FIG. 3, the right leg of the frame member 30 has fixed to its lower end a rearwardly projecting flat bar 43 adapted to underlie and support the bottom member 42 of the frame 21. A bracket 44 welded to the bar 43 and frame member 30 pivotally supports a latch member 45 in overlying relation to the plate 43. The latch member is formed with a hook-shaped end adapted to engage over a latch roller 46 carried between a pair of upstanding lugs 47 on the frame plate 42. Spring means, herein shown as a coiled compression spring 48 anchored to the bar 43 as by a threaded rod 49, yieldably urges the latch member 45 toward latching position and determines the force required to release the latch and permit a breakback movement of the frame and cutter bar. It will be understood, of course, that the spring tension is adjustable so that the release point may be set as preferred by the operator of the mower.

For supporting the drag bar and cutter bar assembly on the swinging frame 21, there is provided a bearing member 50 having a flat, generally rectangular base 51 adapted to abut the underside of the frame plate 42. The bearing member is rigidly secured to the plate as by bolts 52, four such bolts being provided in the exemplary mower. As shown in FIG. 8, the plate 42 is formed with a series of holes 53 so spaced that the bearing member may be located in any one of a series of positions spaced laterally of the frame. This space is coordinated with the dimensions of the other elements of the mower as will appear presently so that the inner end of the cutter bar 22 can be located in proper relation to the right drive wheel of the tractor regardless of the tread width or space of that wheel from the center line of the tractor. As shown in FIGS. 1 and 2, the cutter bar is desirably located so that its inner end is just outside the outer edge of the adjacent tractor drive wheel. The entire length of the cutter bar is thus available for cutting a swath parallel to the path in which the tractor is driven and the tractor wheel need not be driven over any standing crop material.

The drag bar 24 in the preferred form shown comprises a pair of telescopingly engaged sections 55 and 56. Section 55, in this instance, is tubular and has its lower end fitted into and secured to a pivot housing 57 which supports the drivehead 23 for pivotal movement about a fore-and-aft axis. Drag bar section 56 which is telescoped into the other end of the section 55, is preferably a solid round bar. Its projecting end is bent forwardly at right angles for reception in the bearing 50 whereby the drag bar is supported for pivotal movement about a generally horizontal axis substantially parallel to the center line of the tractor. A brace bar 58 having a coupling element 59 at one end adapted to fit over the end of the drag bar section projecting through the bearing 50 extends to and is suitably connected to the pivot housing to reduce the strain on the drag bar.

The two sections of the drag bar are secured together in predetermined angular relation in a novel manner permitting rotation of the section 55 relative to the section 56 for adjusting the up-and-down tilt of the cutter bar 22. For this purpose a radially projecting arm 60 is welded to the end of the section 55 in position to abut a radially projecting arm 61 welded to the section 56 as shown in FIG. 4. The arm 61, at a fixed radial distance from the axis of the bar, has a hole alined with an upright slot 62 in the arm 60. The hole is dimensioned to receive a bolt 63 which is formed with an integral cylindrical cam portion 64 dimensioned for a snug fit in the slot 62. A washer 65 interposed between the head of the bolt and the adjacent face of the arm 60 together with a nut 62' threaded on the bolt confine the cam within the slot.

The cam portion 64 of the bolt is disposed eccentrically of the bolt axis and is accordingly effective to swing the arm 60 either to the left or the right from the position shown in FIG. 5 upon rotation of the bolt 63 clockwise or counterclockwise. By thus shifting the arm 60, the relative angular positioning of the drag bar section 55 relative to the section 56 may be effected. Since the drivehead 23 and cutter bar 22 are carried by the drag bar section 55, such positioning of the section correspondingly adjusts the tilt of the cutter bar. To maintain a selected position of adjustment, the nut 62' threaded on the end of the bolt 63 is screwed up tight against the arm 61.

In accordance with another aspect of the invention, the improved mower is constructed and arranged so that the power operated hitch linkage of the tractor may be utilized to swing the cutter bar about its pivot on the drivehead 23. Such movements are utilized to lift the outer end of the bar for clearing obstructions. The same mechanism is also effective to swing the drag bar about its pivot on the frame 21 for raising and lowering the cutter bar and drivehead assembly between transport and working position.

To provide for such swinging of the cutter bar and drive bar, a bell crank 66 is pivotally mounted on the pivot housing 57, in this instance, by a pair of upstanding lugs 67. The lever has a long arm and a short arm, the latter being connected by a flexible tension member 68, such as a chain, with a lug upstanding from the drivehead 23. Connected to the long arm of the lever 66 by an adjustable coupling element 69 is a flexible tension member 70 preferably in the form of a wire cable.

The cable 70 is carried upwardly over a sheave 71 rotatably supported on a pedestal 72 telescoped into the upper end of the frame post 40. After passing the sheave, which is cocked at an angle as shown in FIG. 3, the cable is led downwardly to an anchorage on a lever 73 (FIG. 7) pivoted on a leg of the frame member 30. As shown in FIG. 1, one end of the lever 73 is bifurcated to straddle the frame member and the pivotal connection therewith is provided by the pin 31 which serves for connection with the adjacent draft link 13.

Referring to FIGS. 6 and 7 of the drawings, the anchorage for the cable 70 is designed to permit quick and easy lengthening or shortening of the cable to accommodate adjustment of the mower for different tractor tread widths. For this purpose, the anchorage comprises a generally oval casting having a peripheral groove 75' affording a nonslip bearing for the cable and of sufficient depth to accommodate a plurality of turns of the cable. The groove 75' is interrupted by a boss 76 having an enlarged recess 77 adapted to seat an anchoring thimble 78 fixed on the end of the cable. A slot in the boss alined with the groove 75' permits the cable to be detached from the anchorage by simply withdrawing the thimble 78 from the recess 77. This slot also serves to retain the cable in place when more than one turn is wound about the anchoring member. The casting 75 is preferably recessed on its face to fit over the lever 73 as shown in FIG. 7 and is rigidly secured thereto as by a bolt 79.

As shown in FIGS. 1 and 7, the lever 73 is formed at its free end with a tip portion 80 turned inwardly to underlie the adjacent draft link 13. The weight of the mower elements exerted through the cable 70, of course, tend to swing the lever upwardly and thus hold the tip securely against the draft link. Since the lever and draft link have a common pivotal connection with the frame member 30, and since the frame member is held in a substantially upright position by its three point connection with the tractor hitch linkage, upward swinging of the draft links to raise the mower frame will obviously rock the lever 73 downwardly or in a counterclockwise direction. In such movement the cable 70 is pulled in a direction to raise the cutter bar and the drag bar. The ratio of the arms of the lever 66 is such that the cutter bar is first swung upwardly to a limit position defined by a stop member 82 on the lever engaging the drag bar section 55. Further pull on the cable is then effective to swing the cutter bar and drivehead assembly in an upward direction.

When the hitch linkage is lowered, the drag bar initially descends until the drivehead 23 reaches working position and thereafter the cutter bar 22 swings downwardly to its projected working position. With the tension thus removed, the cable can be easily wound on or unwound from the anchoring member and may be replaced without the use of tools when necessary.

To relieve the load on the lift mechanism, and to permit the inner cutter bar shoe 81' to follow ground contour with an easy, floating action, provision is made for counterbalancing the weight of the drag bar and the parts which it carries. The counterbalancing means as herein shown comprises a coiled tension spring 81 connected at one end to the long leg of the bell crank lever 66 as by a shackle 82'. This point of connection with the bell crank is spaced closer to the pivot of the crank than the connection of the lift cable 70. The geometry of the linkage thus provided is such that the shoe 81' is allowed ample flotation to follow irregular ground contour without substantially affecting the weight transfer at that shoe and still provide a sufficiently rapid rate of lift to the transport position. At its other end the spring is connected by a threaded anchoring rod 83 with a bracket 84 rigidly mounted on the top member of the swinging frame 21. The tension of the spring may be adjusted by means of a nut threaded on the projecting end of the rod 83.

Figure 3:
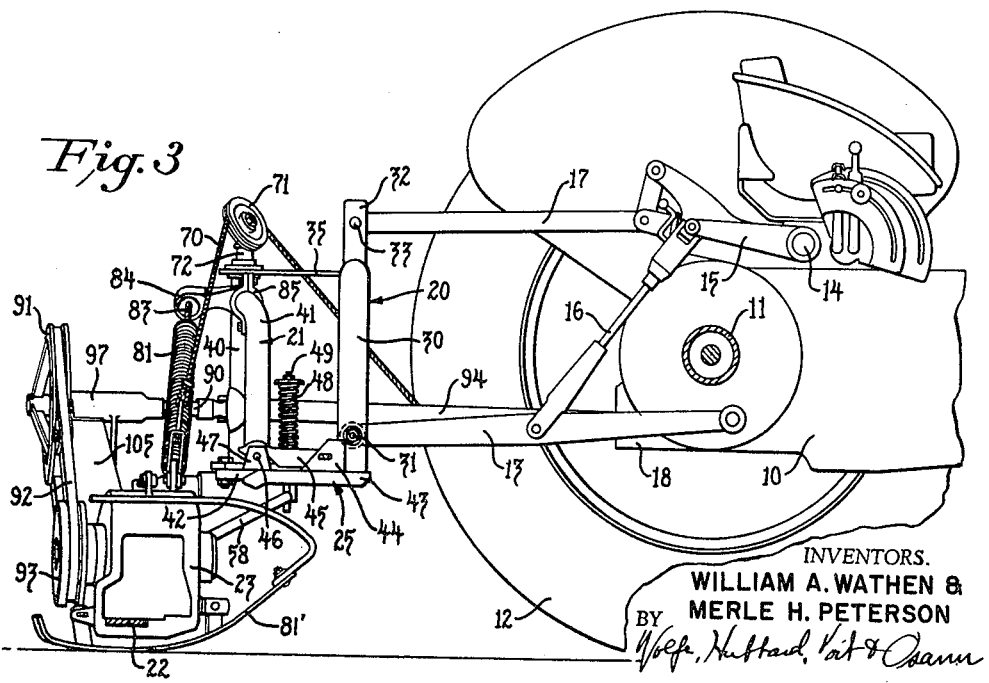
FIG. 3 is a side elevational view of the mower and tractor.

For mounting purposes the bracket 84 is formed with a split sleeve portion 85 adapted to be clamped to the frame member 41 as shown in FIGS. 1 and 3. The bracket can thus be shifted to selected positions along the frame member to conform to the positioning of the drag bar bearing member 50 for different tractor tread widths.

The mechanism for operatively coupling the cutter bar drivehead 23 with the tractor power take off shaft is also constructed and arranged to accommodate adjustments of the cutter bar supporting structure for different tractor tread widths. This mechanism as shown includes a drive shaft 90 rotatably supported on the drag bar for adjustment transversely of the tractor as will appear presently. A grooved pulley 91 fixed to the rear end of the shaft 90 is drivingly connected by a V-belt 92 with the drive pulley 93 for the drivehead 23. The other or forward end of the drive shaft 90 is drivingly connected with the power take-off shaft of the tractor by a telescoping intermediate shaft 94 having universal joints 95 and 96 at opposite ends. One of the universal joints, preferably the rear joint 96, is formed with a socket adapted to receive the squared end of the shaft 90 and permit its withdrawal by a simple rearward movement of the shaft.

In order to establish proper alinement of the mower drive shaft with the tractor power take off shaft when the drag bar bearing member is mounted in any of its various positions, the drive shaft is journaled in a bearing 97 supported for adjustment transversely of the tractor. In the exemplary embodiment, the bearing 97 is carried by a pair of integral arms extending upwardly from a support member 98 pivotally mounted on a shaft 99 secured between a pair of ears 100 welded to the drag bar section 55 as shown in FIGS. 1 and 2. With this arrangement the drive shaft bearing can be rocked about the shaft 99 to provide the proper tension on the driving belt 92.

Simple yet efficient means is provided for maintaining the drive shaft bearing 97 in selected positions of adjustment. This means as shown comprises a positioning bar 101 formed of two sections having their adjacent ends oppositely threaded and connected by an elongated nut 102. One end of the bar is formed with an eye for the reception of a bolt 103 pivotally connecting the bar to the bearing member 97. The other end of the bar 101 is bent over at right angles to engage in a hole 104 in an anchor plate 105 carried by the drag bar. As shown in FIG. 1, the plate 105 is held in spaced relation to the drag bar bearing support and substantially parallel to the plane of the belt 92 by an integral marginal flange extending forwardly into abutting engagement with the drag bar and welded thereto.

In the exemplary mower three of the holes 104 are provided in the plate 105, the holes being spaced apart in conformity with the different mounting positions provided for the bearing member 50. It will be appreciated that additional holes 104 may be provided if desired and, moreover, the spacing may be varied if desired. The adjustment or assembly of the mower parts for use with a tractor of minimum tread width is shown in FIG. 2. To adapt it for a tractor with a wider tread width, the bearing member 50 is shifted to the right to one of its alternate mounting positions and the positioning bar is engaged in an appropriate one of the other holes 104.

The plate 105 also serves as a support for a pair of belt guiding and tensioning pulleys 107. The pivot bolts which journal the pulleys are received in slots 108 in the plate permitting adjustment of the pulleys crosswise of the belt as required. The belt tension may be further adjusted as required by turning the nut 102 on the positioning rod.

It will be apparent from the foregoing that the invention provides a mower of novel and advantageous construction. The improved mower utilizes a simple, rugged frame structure that effectively retains the cutter bar in proper operating position and yet permits a breakback movement in case the cutter bar encounters an obstruction. The sectional construction of the frame coupled with the incorporation of the breakback latch means directly in the frame structure eliminates the separate connections with the tractor required for prior mowers. In general, the improved mower requires no tractor connections other those provided by the hitch linkage.

The improved mower construction is further advantageous in that manufacture and distributing costs are substantially reduced by the ready adjustability of the mower for tractors of different tread width. Thus, a single set of manufactured parts may be initially assembled or reassembled in the field to vary the location of the cutter bar with respect to the center line of the tractor as required by the tread width of the particular tractor upon which the mower is to be mounted. In other words, the mower may be mounted on a tractor of any tread width within the range ordinarily met in agricultural tractors and, by a simple adjustment of the drag bar mounting, the cutter bar may be located so that its inner end lies just outside the drive wheel of the tractor. The full length of the cutter bar is thus available for cutting purposes without requiring the tractor wheel to pass over standing crops.

The invention also provides simple and efficient means whereby the cutter bar and drag bar may be raised and lowered through the action of the tractor hitch linkage and without requiring any separate connection with the tractor for that purpose. This lift mechanism includes a flexible cable together with novel means for attaching it which permits quick and easy interchange of cables when required.

We claim as our invention:

1. A mower for use with a tractor having a rear power take-off shaft comprising, in combination, a frame structure having means for coupling to the rear end of the tractor, a cutter bar, a drag bar having means at one end pivotally supporting said cutter bar, bearing means on said frame structure supporting the other end of said drag bar for vertical swinging movement between operating and transport positions, said bearing means being selectively positionable on said frame structure transversely of the tractor to variably locate the cutter bar relative to the center line of the tractor, a drive shaft having a V-belt driving connection with said cutter bar, means supporting said drive shaft on said drag bar, said supporting means being shiftable transversely of the tractor to maintain the driving connection under proper tension, and means for retaining said supporting means in selected positions of adjustment.

2. A mower for use with a tractor having a trailing power elevatable hitch linkage, a rear power take-off shaft and drive wheels adjustable for different tread widths, a frame structure having means for operative connection with the tractor draft linkage, a drag bar, a cutter bar and drivehead therefor carried at one end of said drag bar, bearing means on said frame structure supporting the other end of said drag bar, said bearing means being adjustably positionable laterally of said frame structure to properly locate the cutter bar in accordance with the tread width of the tractor drive wheels, means for driving the cutter bar including a drive shaft having means for operative connection with the tractor power take-off shaft, a pulley on said drive shaft having a V-belt driving connection with said drivehead, and a bracket supporting said drive shaft pivotally mounted on the drag bar to swing transversely of the tractor for adjusting the tension of said V-belt.

3. A mower for use with a tractor having a trailing power elevatable hitch linkage, a rear power take-off shaft and drive wheels adjustable for different tread widths, a frame structure having means for operative connection with the tractor draft linkage, a drag bar, a cutter bar and drive head therefor carried at one end of said drag bar, bearing means on said frame structure supporting the other end of said drag bar, said bearing means being adjustably positionable laterally of said frame structure to properly locate the cutter bar in accordance with the tread width of the tractor drive wheels, means for driving the cutter bar including a drive shaft having means for operative connection with the tractor power take-off shaft, a V-belt connecting said shaft with said drivehead, and a bracket supporting said drive shaft pivotally mounted on the drag bar to swing transversely of the tractor and a linkage connected between said bracket and said drag bar adjustable to vary the tension on the belt.

4. In a mower for use with a tractor having a trailing hitch linkage and a rear power take-off shaft, in combination, a frame having means for operative connection with the tractor hitch linkage, a cutter bar and drivehead assembly, a drag bar supporting said assembly on the frame including a first section operatively connected with the assembly and a second section pivotally mounted on the frame, one of said sections being tubular and telescopingly fitted over the other section, an arm rigidly fixed to said second section and projecting radially therefrom, means for driving the cutter bar including a drive shaft having means for operative connection with the power take-off shaft, a pulley on said drive shaft having a V-belt driving connection with said cutter bar drivehead, a bearing for said drive shaft, support means rigid with said first drag bar section pivotally supporting said bearing to swing in a direction to adjust the tension of said V-belt, said support means including an arm positioned in face-to-face relation with the arm on said second drag bar section, and means coacting with said arms for releasably retaining said drag bar sections in selected angularly related positions.

5. In a mower for use with a tractor having a trailing hitch linkage and a rear power take-off shaft, in combination, a frame having means for operative connection with the tractor hitch linkage, a cutter bar and drivehead assembly, a drag bar supporting said assembly on the frame including a lower section operatively connected with the assembly, an upper section pivotally mounted on the frame, one of said sections being tubular and telescopingly fitted over the other section, an arm rigidly fixed to said upper section and projecting radially therefrom, means for driving the cutter bar including a drive shaft having means for operative connection with the power take-off shaft, a pulley on said drive shaft having a V-belt driving connection with said cutter bar drivehead, a bearing for said drive shaft, support means rigid with said lower drag bar section pivotally supporting said bearing to swing in a direction to adjust the tension of said V-belt, said support means including an arm positioned in face-to-face relation with the arm on said upper drag bar section, and a connecting element extending through said arms for securing them together, said element permitting limited movement of the arms relative to each other to provide for adjusting the relative angular relationship of the drag bar sections.

References Cited in the file of this patent
UNITED STATES PATENTS

| | | |
|---|---|---|
| 2,248,332 | Budelier et al. | July 8, 1941 |
| 2,637,966 | Richey | May 12, 1953 |
| 2,686,999 | Smith | Aug. 24, 1954 |
| 2,827,747 | Carlson et al. | Mar. 28, 1958 |
| 2,910,816 | McCarty et al. | Nov. 3, 1959 |
| 2,932,931 | Elfes et al. | Apr. 19, 1960 |